US012254210B2

(12) United States Patent
Thacker et al.

(10) Patent No.: US 12,254,210 B2
(45) Date of Patent: Mar. 18, 2025

(54) DEVICES, METHODS, AND COMPUTER READABLE MEDIA FOR CONTROL PAGE FLUSH HANDLING

(71) Applicant: Western Digital Technologies, Inc., San Jose, CA (US)

(72) Inventors: Nikita Thacker, Bengaluru (IN); Bhuvanesh Subramanian, Bengaluru (IN); Naveen Subbegoundanputhur Krishnaraj, Bengaluru (IN); Ramanathan Muthiah, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 78 days.

(21) Appl. No.: 18/447,941

(22) Filed: Aug. 10, 2023

(65) Prior Publication Data
US 2024/0211165 A1    Jun. 27, 2024

Related U.S. Application Data

(60) Provisional application No. 63/477,299, filed on Dec. 27, 2022.

(51) Int. Cl.
*G06F 3/00*    (2006.01)
*G06F 3/06*    (2006.01)

(52) U.S. Cl.
CPC .......... *G06F 3/0652* (2013.01); *G06F 3/0683* (2013.01); *G06F 3/0604* (2013.01)

(58) Field of Classification Search
None
See application file for complete search history.

(56) References Cited

U.S. PATENT DOCUMENTS

| 8,335,907 | B2 | 12/2012 | Sinclair et al. |
| 10,459,636 | B2 | 10/2019 | Frid et al. |
| 10,983,918 | B2 | 4/2021 | Manganelli et al. |
| 11,003,587 | B2 | 5/2021 | Haswell |
| 2019/0340134 | A1* | 11/2019 | Haswell .............. G06F 12/0246 |
| 2021/0096984 | A1 | 4/2021 | Luo et al. |

FOREIGN PATENT DOCUMENTS

CN    113297099 A    8/2021

\* cited by examiner

*Primary Examiner* — Midys Rojas
(74) *Attorney, Agent, or Firm* — Michael Best & Friedrich LLP (57) ABSTRACT

Embodiments herein provide a data storage device including a non-volatile memory, a second memory, and a controller coupled to the non-volatile memory and the second memory. The second memory is configured to store a plurality of delta queues. Each of the plurality of delta queues includes delta queue entries. The delta queue entries are grouped into one or more logical-to-physical (L2P) pages. Each of the one or more L2P pages is associated with a plurality of logical flash management units (LFMUs) corresponding to a plurality of physical addresses in the non-volatile memory. The controller is configured to determine that a delta queue flush is required. In response to determining that the delta queue flush is required, the controller selects one of the plurality of delta queues to flush, and flushes the one or more L2P pages stored in the one of the plurality of delta queues to the non-volatile memory.

20 Claims, 6 Drawing Sheets

DEVICES, METHODS, AND COMPUTER READABLE MEDIA FOR CONTROL PAGE FLUSH HANDLING

CROSS-REFERENCE TO RELATED APPLICATION

This application claims priority to and the benefit of U.S. Provisional Patent Application No. 63/477,299, filed on Dec. 27, 2022, the entire contents of which is incorporated herein by reference.

FIELD

This application generally relates to data storage devices and, more particularly, to data storage devices implementing a delta queue architecture for reducing write amplification.

SUMMARY

Write amplification (WA) is an undesirable phenomenon associated with flash memory and solid-state drives (SSDs) where the actual amount of information physically written to the storage media is a multiple of the logical amount intended to be written. Frequent writes the flash memory result in increased write amplification. A delta queue may be used to cache recently-accessed control data, such as logical to physical (L2P) mapping information, in order to reduce write amplification of flash memory. The delta queue may be flushed to the flash memory after a predetermined period of time. However, there is an increased risk of write amplification if the L2P information is not stable before being flushed to flash memory. Additionally, the worst case search time for an L2P entry in a delta queue may be large.

The disclosure provides a data storage device, in one embodiment, including a non-volatile memory, a second memory, and a controller coupled to the non-volatile memory and the second memory. The second memory is configured to store a plurality of delta queues. Each of the plurality of delta queues includes delta queue entries. The delta queue entries are grouped into one or more logical-to-physical (L2P) pages. Each of the one or more L2P pages is associated with a plurality of logical flash management units (LFMUs) corresponding to a plurality of physical addresses in the non-volatile memory. The controller is configured to determine that a delta queue flush is required. In response to determining that the delta queue flush is required, the controller selects one of the plurality of delta queues to flush, and flushes the one or more L2P pages stored in the one of the plurality of delta queues to the non-volatile memory.

The disclosure also provides a method performed by a data storage device that receives commands from a host device. The method includes controlling, with a controller, a second memory to store a plurality of delta queues. Each of the plurality of delta queues includes delta queue entries. The delta queue entries are grouped into one or more logical-to-physical (L2P) pages. Each of the one or more L2P pages is associated with a plurality of logical flash management units (LFMUs) that corresponds to a plurality of physical addresses in the non-volatile memory. The method also includes determining, with the controller, that a delta queue flush is required, and, in response to determining that a delta queue flush is required, selecting, with the controller, one of the plurality of delta queues to flush. The method also includes flushing, with the controller, the one or more L2P pages stored in the one of the plurality of delta queues to the non-volatile memory.

The disclosure also provides a non-transitory computer-readable medium storing instructions that, when executed by a data storage device, cause the data storage device to perform a set of operations. The set of operations includes storing, in a second memory, a plurality of delta queues, and storing, as delta queue entries, a plurality of logical flash management units (LFMUs), the delta queue entries grouped into one or more of logical-to-physical (L2P) pages. Each L2P page corresponds to a range of logical flash management units (LFMUs) in a non-volatile memory. The set of operations also includes determining that a delta queue flush is required, and in response to determining that a delta queue flush is required, selecting one of the plurality of delta queues to flush. The set of operations also includes flushing the one or more L2P pages stored in the one of the plurality of delta queues to the non-volatile memory.

Various aspects of the present disclosure provide for improvements in data storage devices, for example, optimizing the processes in which host device inputs/outputs are handled by data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
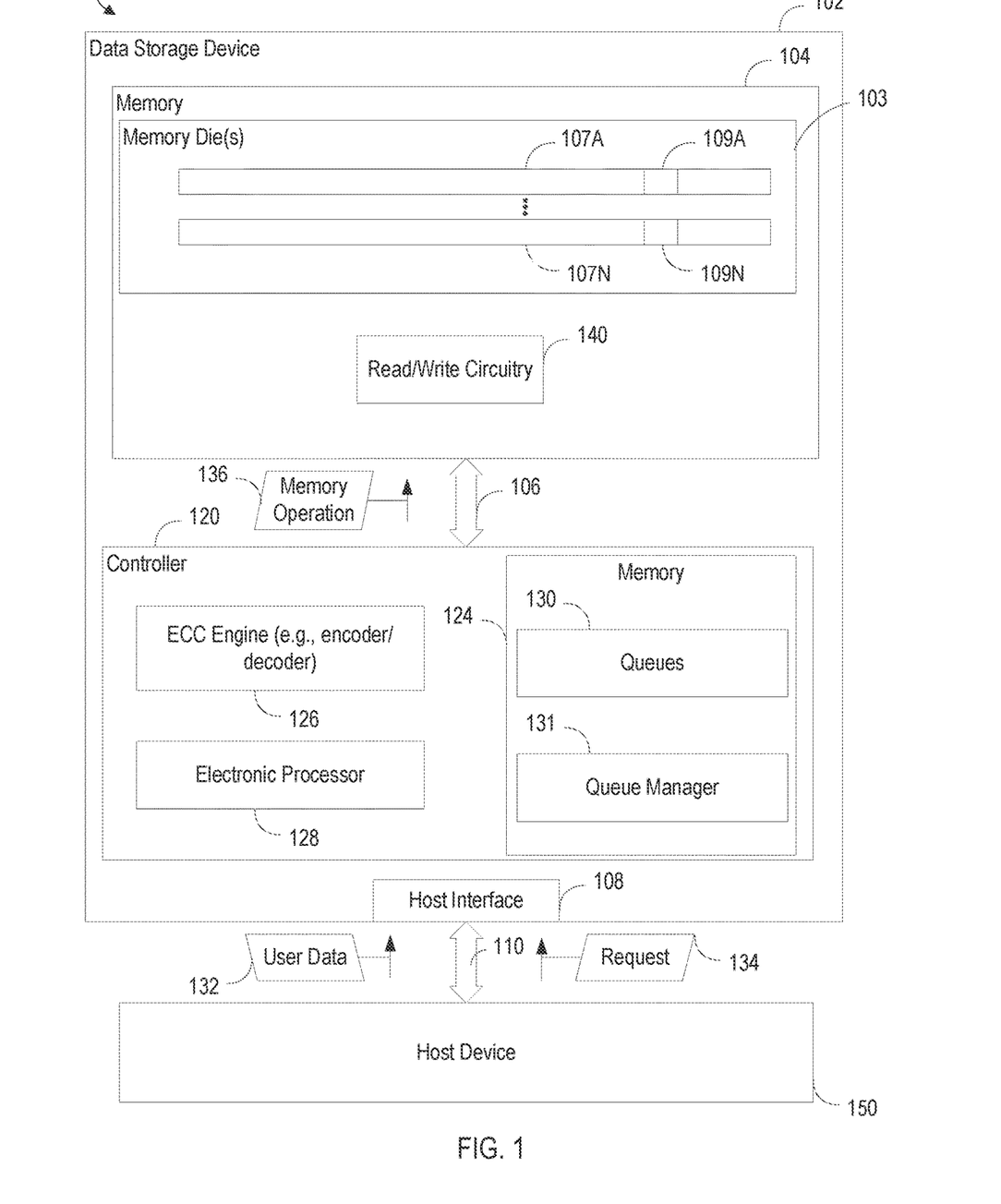
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The data storage device 102 includes the data storage device controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150. For example, the data storage device controller 120 may send data to the host device 150 via the interface 108, and the data storage device controller 120 may receive data from the host device 150 via the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include at least one memory 124 (for example, at least one random access memory ("RAM"), at least one read-only memory ("ROM"), at least one non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. In particular, the memory 124 stores a plurality of delta queues 130 for caching control data that is read from and/or to be written to the memory 104. For example, the plurality of delta queues 130 store Group Address Table (GAT) entries for converting logical memory addresses to physical memory locations. Storing control data in the delta queues helps to improve the performance of the device controller, and in some examples, the endurance of non-volatile memory by reducing write amplification to non-volatile memory such as the memory 104.

The memory 124 also stores a delta queue manager 131 for managing the plurality of delta queues 130. The delta queue manager 131 may be implemented as software, firmware, or a combination thereof. The delta queue manager 131 is stored in a non-volatile memory of the at least one memory 124.

Additionally, although the data storage device controller 120 is illustrated in FIG. 1 as including the at least one memory 124, in other implementations, some or all of the at least one memory 124 is instead located separate from the data storage device controller 120 and executable by the electronic processor 128 or a different electronic processor that is external to the data storage device controller 120 and/or the data storage device 102. For example, the at least one memory 124 may include dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The data storage device controller 120 may send the memory operation 136 (e.g., a read command) to the memory 104 to cause the read/write circuitry 140 to sense data stored in a storage element. For example, the data storage device controller 120 may send the read command to the memory 104 in response to receiving a request for read access from the host device 150.

The device controller 120 maintains a logical to physical (L2P) table that maps logical addresses used by the host device to physical addresses used by the memory 104. The L2P table is also referred to herein as a global address table (GAT). Each GAT entry may contain mapping information for a predetermined number of sectors (e.g., eight sectors), or one logical flash management unit (LFMU) that maps to one or more physical addresses in the memory 104. Each sector includes 512 bytes of data, but other amounts may be used. Each entry in a delta queue corresponds to one LFMU. Accordingly, an LFMU entry in a delta queue may alternatively be referred to herein as a GAT entry. Each entry may require 8 or 16 bytes. Because the minimum programmable unit for the memory 104 is a page of data, GAT entries in the delta queue are grouped together before being loaded from or flushed to the memory 104. These groups of GAT entries may herein be referred to as a control page, a GAT page, a GAT part, or an L2P page. Accordingly, when the device controller 120 loads a new LFMU entry to a delta queue, the device controller 120 loads the GAT page associated with the new LFMU entry to the delta queue.

Traditionally, a single delta queue is maintained for the cached GAT entries. When the device controller 120 receives a request to perform an L2P operation (e.g., a write operation), the device controller 120 searches the entire delta queue for the most recent cached GAT entry. A single delta queue therefore has a worst-case search time of O(N) (e.g., a linear time complexity). Additionally, GAT entries are typically held in the delta queue for a predetermined period of time with the expectation that the data will become stable, or cold, during the predetermined period of time. After the predetermined period of time, the entries are flushed to the memory 104. This scheme does not take into consideration the nature of the workload (e.g., host random data, host sequential data, accelerator data, etc.), and there is a risk of flushing GAT entries to the memory 104 that have not yet become stable. Prematurely flushing data to the memory 104 increases write amplification. Therefore, there exists a need to reduce the search time of the delta queue while reducing write amplification in the memory 104.

Figure 2:
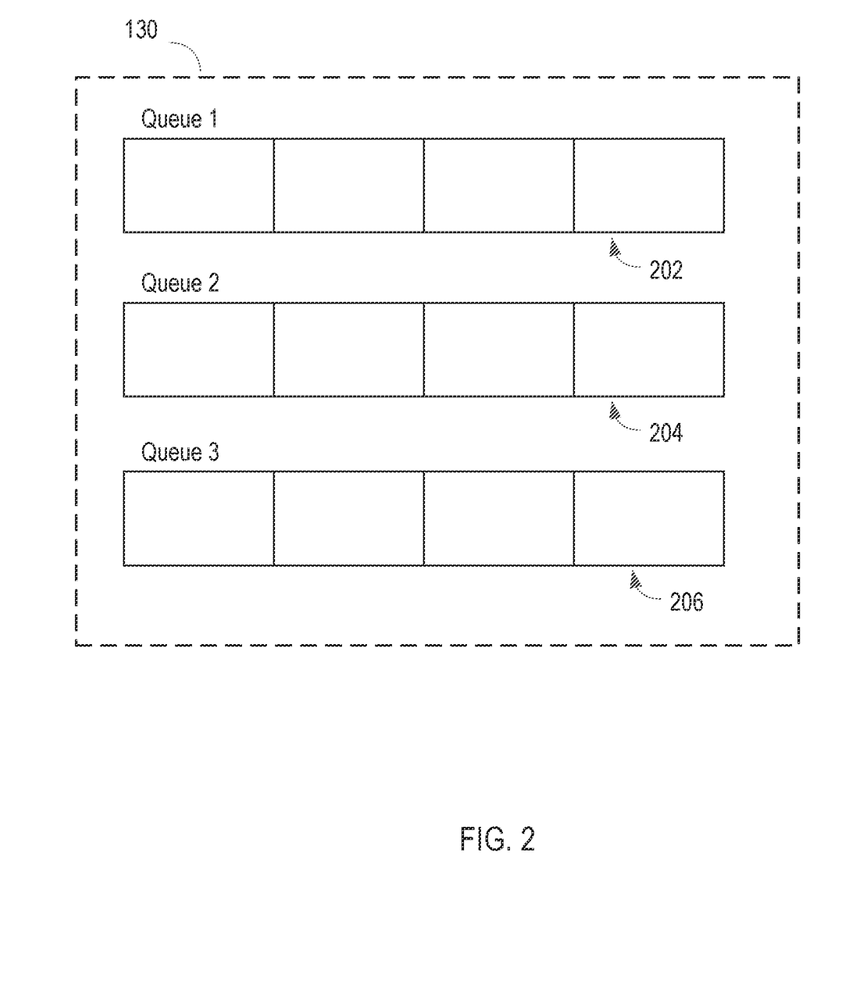
FIG. 2 is a diagram illustrating a first example delta queue implementation, in accordance with some embodiments of the disclosure.

Referring now to FIG. 2, rather than maintaining a single delta queue to store cached GAT entries, the device controller 120 maintains a plurality of delta queues 130. In the illustrated example, the plurality of delta queues 130 includes three delta queues (e.g., a first delta queue 202, a second delta queue 204, and a third delta queue 206). However, the plurality of delta queues 130 is not limited to three, and may be more than three or less than three. The plurality of delta queues 130 implemented by the device controller 120 may be determined by the device controller 120 in accordance with the needs of the system 100.

The maximum number of GAT entries that may be stored in the plurality of delta queues 130 may also be determined by the device controller 120 in accordance with the needs of the system. For example, the device controller 120 may implement the plurality of delta queues 130 such that a total of 1,280 GAT entries may be stored in the plurality of delta queues 130. For example, in some instances, each delta queue of the plurality of delta queues 130 may hold a maximum of 320 entries. However, as described in greater detail below, the number of entries stored by each delta queue of the plurality of delta queues 130 may vary such that the maximum number of entries collectively stored by the plurality of delta queues 130 sum to 1,280 entries. The maximum number of GAT entries that the plurality of delta queues 130 are configured to collectively store is not limited to 1,280. The device controller 120 may select the maximum number of entries as a function of allotted size for the plurality of delta queues 130 divided by the size of each LFMU entry.

Each delta queue of the plurality of the delta queues 130 may hold GAT entries corresponding to a particular range of LFMUs. The range of LFMUs for which each delta queue stores entries may be determined using any suitable hashing function. For example, the device controller 120 may be configured to hash a first range of LFMUs (e.g., associated with GAT parts 0-4) to the first delta queue 202, a second range of LFMUs (e.g., associated with GAT parts 5-9) to the second delta queue 204, and a third range of LFMUs (e.g., associated with GAT parts 10-14) to the third delta queue 206. When the device controller 120 receives a request to perform an L2P operation for a particular LFMU, the device controller 120 searches only the particular delta queue (e.g., a target delta queue) that stores the corresponding entry, rather than searching each of the plurality of delta queues 130. Therefore, the worst case search time for a GAT entry is dependent on the size of the target delta queue, rather than on the total number of entries in the plurality of delta queues 130.

In some instances, a range of LFMUs associated with a particular one of the plurality of delta queues 130 may be overwritten more frequently than a range of LFMUs associated with other delta queues in the plurality of delta queues 130. For example, ranges of LFMUs associated with random data may be overwritten, and therefore invalidated, more frequently than ranges of LFMUs associated with sequential data. As described above, the plurality of delta queues 130 is configured to collectively store a predetermined maximum number of entries (e.g., 1,280 entries). If the number of entries that each delta queue in the plurality of delta queues 130 may hold is fixed, then there is a possibility that the target delta queue may have insufficient space to store new GAT entries, even while other delta queues have sufficient available space. For example, if each delta queue is limited to storing a maximum of 320 entries, and the target delta queue currently stores 320 entries, then the target delta queue must be flushed before any new GAT entries are added to the target delta queue, regardless of the available storage capacity of the other delta queues. To mitigate this problem without prematurely flushing the target delta queue, the device controller 120 implements each of the delta queue in the plurality of delta queues 130 as a linked list that can grow dynamically as the system workload changes.

Figure 3:
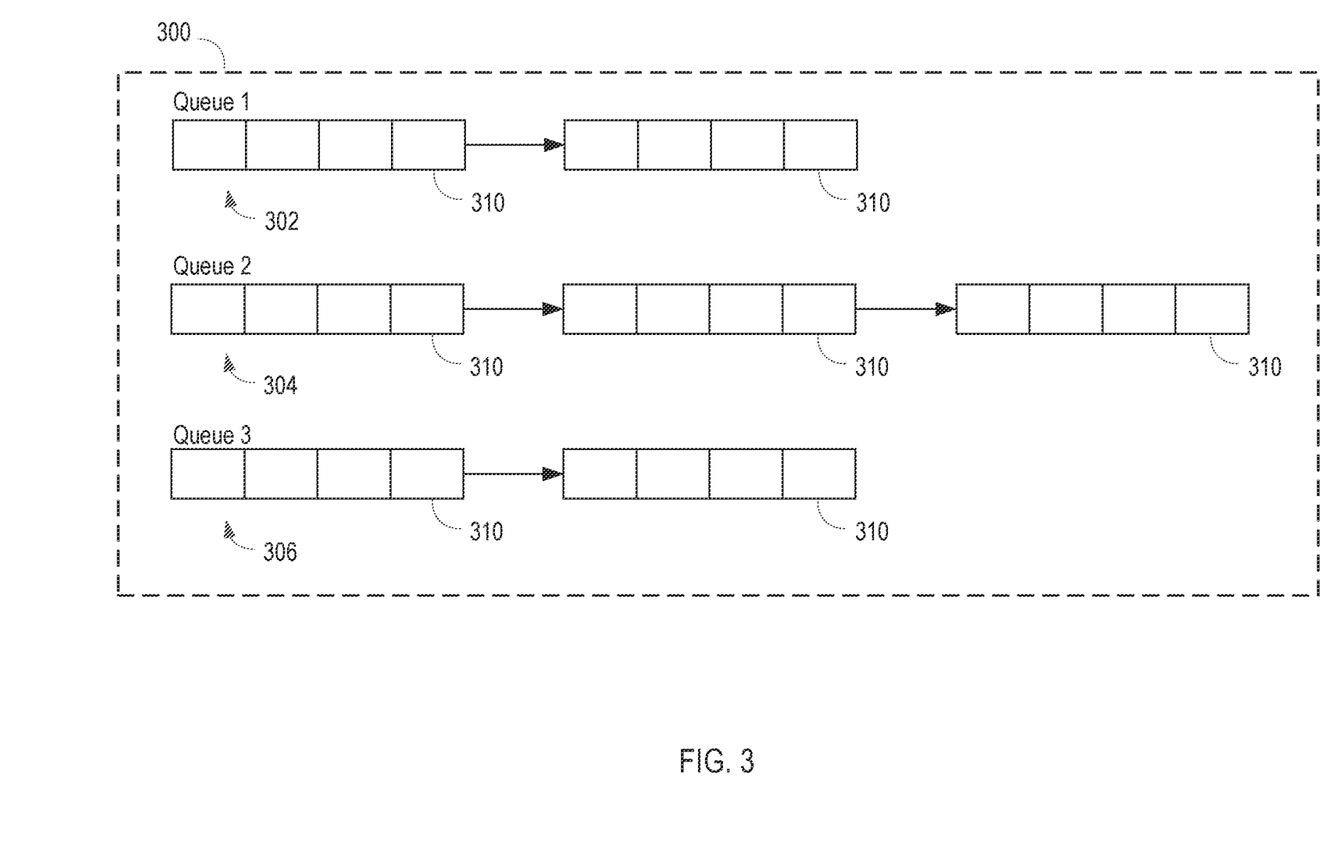
FIG. 3 is a diagram illustrating a second example delta queue implementation, in accordance with some embodiments of the disclosure.

For example, FIG. 3 illustrates a second example plurality of delta queues 300, in accordance with some embodiments. The second example plurality of delta queues 300 is similar to the plurality of delta queues 130.

The second example plurality of delta queues 300 includes a first delta queue 302, a second delta queue 304, and a third delta queue 306. In the example illustrated in FIG. 3, the first delta queue 302 includes two nodes 310, the second delta queue 304 includes three nodes 310, and the third delta queue 306 includes one node 310. The device controller 120 initializes each delta queue with a single node 310. Each node 310 includes an array of GAT entries. By implementing each node 310 as an array of entries rather than as a single entry, the device controller 120 reduces the total number of nodes 310 in a delta queue relative to the number of GAT entries in that delta queue, thus reducing the memory overhead required to implement the delta queue.

Each array may store a predetermined number of entries (e.g., 5 entries, 20 entries, 100 entries, 200 entries, or other suitable predetermined number of entries). In the illustrated examples, each node 310 includes four GAT entries. A delta queue is considered full when all of the array entries in each node 310 are full. When a target delta queue is full but the total number of entries in the plurality of delta queues 130 is less than the maximum number of entries the plurality of delta queues 130 may collectively store, the device controller 120 allocates a new node 310 to the target delta queue. Referring still to FIG. 3, for example, when the first delta queue 302 becomes full, the device controller 120 may append a third node 310 to the first delta queue 302. Similarly, when the second delta queue 304 becomes full, the device controller 120 may append a fourth node 310 to the second delta queue 304.

One or more delta queues in the plurality of delta queues 130 must be flushed to the memory 104 when the total number of GAT entries collectively stored in the plurality of delta queues 130 reaches the maximum number of entries the plurality of delta queues 130 are configured to store. As described above, prematurely flushing a delta queue before the control data held in the delta queue is sufficiently cold may increase write amplification of the memory 104. To mitigate this problem, the device controller 120 tracks how frequently ranges of LFMUs, or GAT pages, are overwritten, or "invalidated," in the plurality of delta queues 130. As described above, the device controller 120 may invalidate GAT pages associated with random data more frequently than those associated with sequential data. Therefore, it may be preferable to flush pages associated with sequential data rather than random data to the memory 104, as it is less likely that the sequential data will be accessed again after being flushed.

Figure 4:
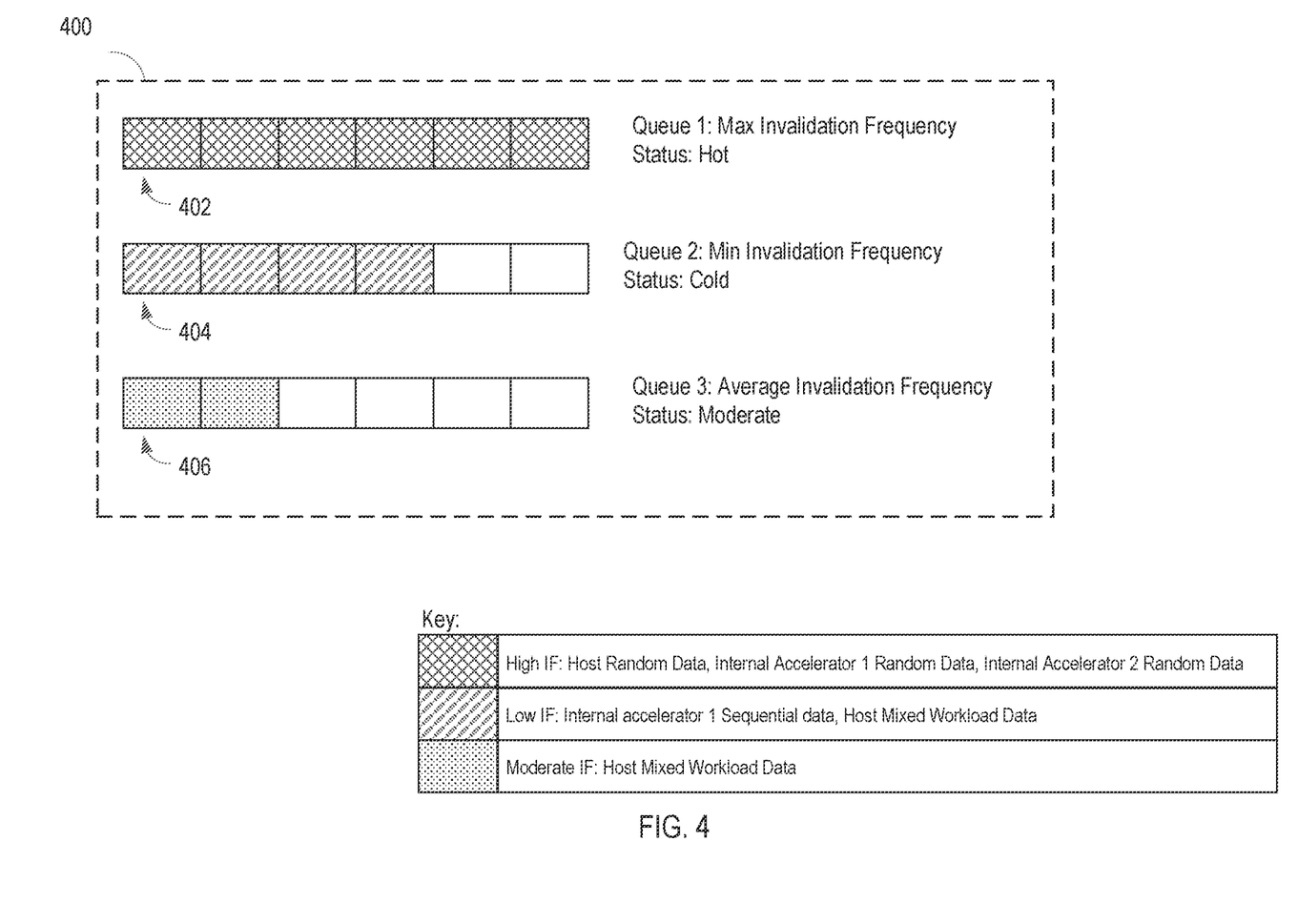
FIG. 4 is a diagram illustrating a third example delta queue implementation, in accordance with some embodiments of the disclosure.

The control device 102 determines an invalidation frequency for each GAT page in a delta queue. For example, FIG. 4 illustrates a third example plurality of delta queues 400 storing GAT pages having different invalidation frequencies. The third example plurality of delta queues 400 is similar to the plurality of delta queues 130 and the plurality of delta queues 300. For simplicity, each of the plurality of delta queues 130 illustrated in FIG. 4 is illustrated as having a single node. As illustrated in FIG. 4, a first delta queue 402 holds control data associated with host random data, random data from a first internal accelerator of the data storage device 102, and random data from a second internal accelerator of the data storage device 102. A second delta queue 404 holds control data associated with host sequential data, and sequential data from the first internal accelerator of the data storage device 102. A third delta queue 406 holds control data associated with host mixed workload data. In the illustrated example, the control pages associated with random data each have a higher page invalidation frequency than those associated with sequential data and mixed workload data. The control pages associated with mixed workload data have a higher page invalidation frequency than those associated with sequential data. It should be understood that types of workloads for which the plurality of delta queues 400 may store control data is not limited to those illustrated in FIG. 4.

When the device controller 120 receives a request for an L2P operation for an LFMU whose GAT page is stored in the plurality of delta queues 400, the device controller increments the page invalidation frequency for the corresponding GAT page for that entry. The device controller 120 then determines a delta queue invalidation frequency based on the page invalidation frequency for each GAT page in a respective delta queue. For example, the device controller 120 calculates a delta queue invalidation frequency for each delta queue based on a sum of the page invalidation frequencies for each GAT page held in each respective delta queue. When the plurality of delta queues 400 are full, or when one or more delta queues in the plurality of delta queues 400 otherwise must be flushed, the device controller 120 selects the delta queue having the lowest delta queue invalidation frequency, and flushes the contents of that delta queue to the memory 104.

Figure 5:
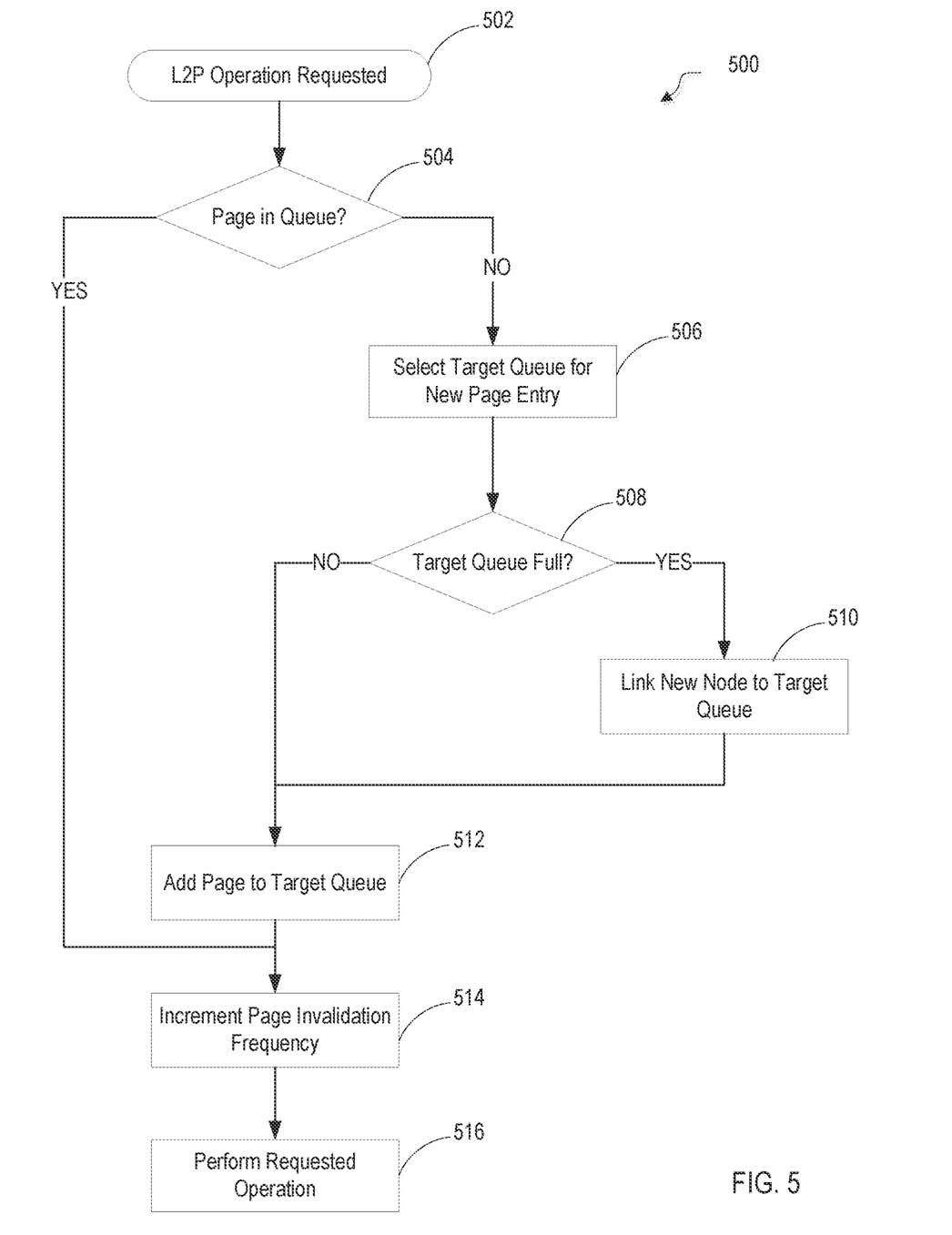
FIG. 5 is a flowchart illustrating a method of adding a new control page to a delta queue, in accordance with some embodiments of the disclosure.

FIG. 5 is a flowchart illustrating an example method 500 for adding a new GAT page to a delta queue, in accordance with some embodiments of the disclosure. The method 500 is described with respect to the data storage device controller 120 of FIG. 1. While FIG. 5 illustrates a particular order of steps, in some embodiments, the method 500 may be performed in a different order. Additionally, in some embodiments, the method 500 includes additional steps or fewer steps.

As illustrated in FIG. 5, the method 500 includes receiving, with the device controller 120, a L2P operation request (e.g., a page write request) for a particular LFMU from the host device (e.g., the host device 150). The method 500 includes determining, with the device controller 120, whether the GAT page associated with the LFMU (e.g., the target GAT page) is currently stored in one of the plurality of delta queues 130 (at decision block 504). For example, the device controller 120 determines whether the target GAT page is held in a particular one of the plurality of delta queues 130 based on a hashing function used by the device controller for hashing GAT pages to the plurality of delta queues 130. When the device controller 120 determines the target GAT page is not stored in any one of the plurality of delta queues 130 ("NO" at decision block 504), the device controller selects one of the plurality of delta queues 130 as a target delta queue for adding the target GAT page (at block 506). The device controller 120 selects the target delta queue using the hashing function, for example, a hashing function based on the address of the GAT page, or any suitable hashing function. After selecting the target delta queue, the device controller 120 determines whether the target delta queue is full (at decision block 508). For example, the device controller 120 determines whether every array entry for every node in the target delta queue is full. When the device controller 120 determines that the target delta queue is full ("YES" at decision block 508), the device controller 120 links a new node to the target delta queue (at block 510).

After linking the new node to the target delta queue, the new node including an array for storing a predetermined number of GAT page entries, the device controller 120 adds the target GAT page to the to the target delta queue (at block 512). For example, the device controller 120 accesses the memory 104 and loads the target GAT page to the next available position in the target delta queue. After adding the target GAT page to the target delta queue, the device controller 120 increments the page invalidation frequency for the target GAT page in the target delta queue (at block 514). The device controller 120 then performs the requested L2P operation (at block 516).

In contrast, when the device controller 120 determines that the target delta queue is not full ("NO" at decision block 508), the device controller 120 does not link a new node to the target delta queue and instead proceeds to add the target GAT page to the next available position in the target delta queue (at block 512). After adding the target GAT page to the target delta queue, the device controller 120 increments the page invalidation frequency for the target GAT page (at block 514) and performs the requested L2P operation (at block 516).

In contrast, when the device controller 120 determines that the target GAT page is held in a delta queue ("YES" at decision block 504), the device controller 120 increments the page invalidation frequency for the target GAT page (at block 514). After incrementing the page invalidation frequency, the device controller 120 performs the requested L2P operation (at block 516).

Figure 6:
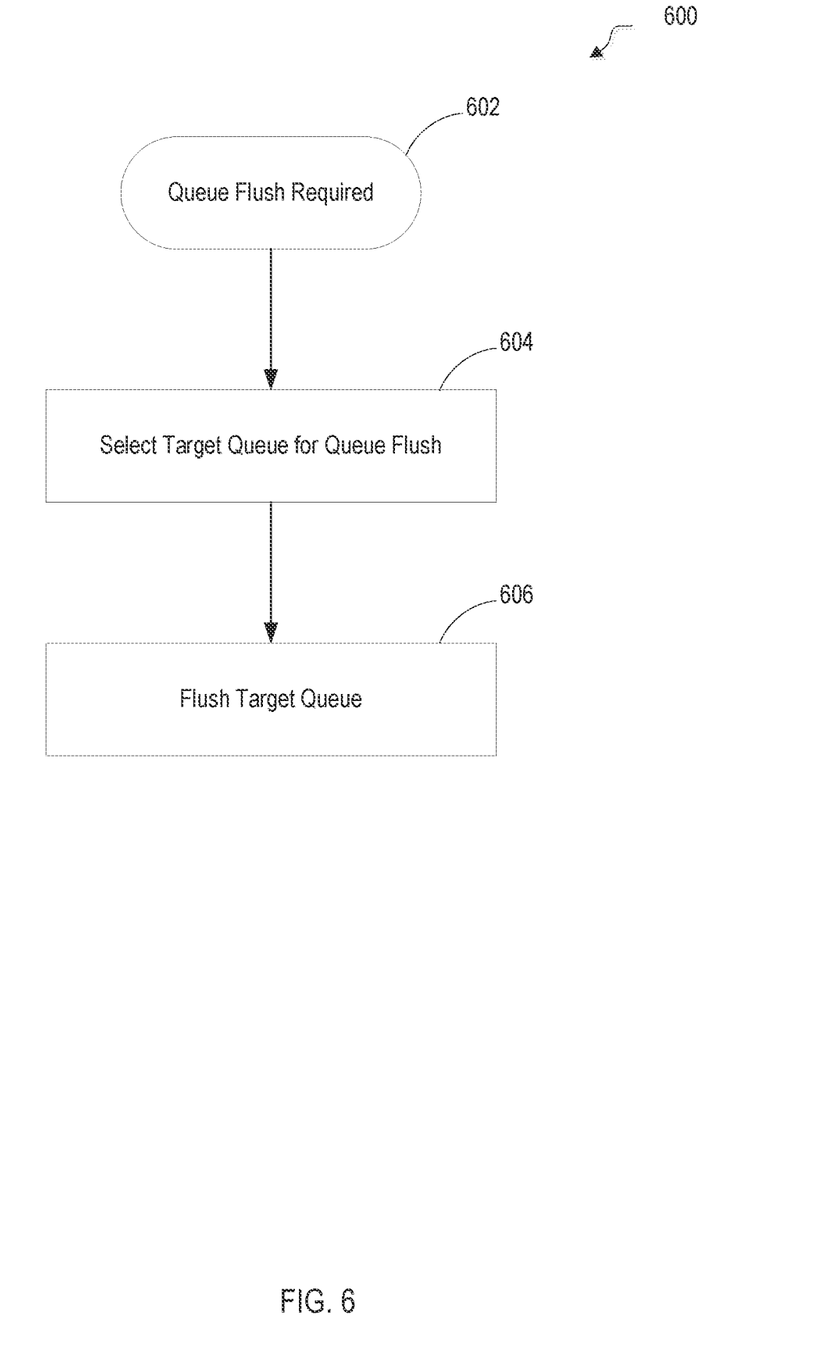
FIG. 6 is a flowchart illustrating a method for flushing delta queues, in accordance with some embodiments of the disclosure.

FIG. 6 is a flowchart illustrating an example method 600 for flushing delta queues, in accordance with various aspects of the present disclosure. The method 600 is described with respect to the device controller 120 of FIG. 1. While FIG. 6 illustrates a particular order of steps, in some embodiments, steps may be performed in a different order. Additionally, in some embodiments, the method 600 includes additional steps or fewer steps.

The method 600 includes determining, with the device controller 120, that a delta queue flush is required (at block 602). The device controller 120 may determine that a delta queue flush is required in response to determining that the total number of GAT entries collectively held in the plurality of delta queues 130 is equal to the maximum number of GAT entries that the plurality of delta queues 130 are collectively configured to store. However, the device controller 120 may use any suitable scheme for determining that a delta queue flush is required. In some instances, the device controller 120 determines that a delta queue flush is required before the total number of GAT entries held in the plurality of delta queues 130 reaches the maximum number of GAT entries. For example, the device controller 120 may determine that a delta queue flush is required in response to receiving a request for an L2P operation for an LFMU associated with a GAT page that is not currently held in one of the plurality of delta queues 130. In response to receiving the request, the device controller 120 may determine that one or more delta queues 130 must be flushed in order to add a new GAT page to a delta queue. The device controller 120 may determine that a delta queue flush is required according to other firmware requirements, or flushing schemes.

The method 600 includes selecting, with the device controller 120, a target delta queue for performing a delta queue flush (at block 604). For example, the device controller 120 calculates the delta queue invalidation frequency for each of the plurality of delta queues 130 based on a sum of the page invalidation frequencies for each GAT page held in each respective delta queue. The device controller 120 may select the delta queue having the lowest invalidation frequency as the target delta queue. In some instances, the device controller 120 selects a plurality of target delta queues to be flushed. For example, the device controller 120 may select, as target delta queues, each delta queue having a delta queue invalidation frequency less than a delta queue invalidation frequency threshold. Alternatively or in addition, the device controller 120 may select a predetermined number of target delta queues. In such instances, the device controller 120 may select, as target delta queues, the predetermined number of delta queues 130 having the lowest delta queue invalidation frequencies. For example, the device controller 120 may rank the plurality of delta queues 130 from coldest to hottest based on the respective delta queue invalidation frequencies, and select the two delta queues having the lowest delta queue invalidation frequencies. It should be understood that the predetermined number of target delta queues is not limited to two, and may be more than two or less than two.

The method 600 includes flushing the target delta queue to the memory 104 (at block 606). For example, the device controller 120 flushes the target delta queue by writing the contents of the target delta queue (e.g., the GAT page entries held in the target delta queue) to the memory 104. After being flushed to the memory 104, the target delta queue is considered empty by the device controller 120. For example, the device controller 120 resets the delta queue invalidation frequency for the target delta queue to zero. In some instances, the device controller 120, after flushing the target delta queue to memory 104, removes the empty nodes from the target delta queue.

It is to be understood that the above description is intended to be illustrative and not restrictive. Many embodiments and applications other than the examples provide would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
   a non-volatile memory;
   a second memory configured to store a plurality of delta queues, each of the plurality of delta queues includes delta queue entries, the delta queue entries are grouped into one or more logical-to-physical (L2P) pages, and each of the one or more L2P pages is associated with a plurality of logical flash management units (LFMUs) that corresponds to a plurality of physical addresses in the non-volatile memory; and
   a controller coupled to the non-volatile memory and the second memory and configured to:
   determine that a delta queue flush is required,
   in response to determining that the delta queue flush is required, select one of the plurality of delta queues to flush, and
   flush the one or more L2P pages stored in the one of the plurality of delta queues to the non-volatile memory.

2. The data storage device of claim 1, wherein the controller is further configured to:
   calculate a page invalidation frequency for each L2P page stored in the plurality of delta queues,
   receive a request to perform an L2P operation for a particular LFMU,
   determine whether a L2P page associated with the particular LFMU is stored in a particular one of the plurality of delta queues,
   in response to determining that the L2P page associated with the particular LFMU is stored in the particular one of the plurality of delta queues, increment the page invalidation frequency for the L2P page, and
   perform the L2P operation for the particular LFMU.

3. The data storage device of claim 2, wherein the controller is further configured to:
   in response to determining that the L2P page associated with the particular LFMU is not stored in the particular one of the plurality of delta queues, select one of the plurality of delta queues as a target delta queue,
   determine whether the target delta queue is full,
   in response to determining that the target delta queue is not full, add the L2P page to the target delta queue,
   increment the page invalidation frequency for the target delta queue, and
   perform the L2P operation for the particular LFMU.

4. The data storage device of claim 3, wherein each of the plurality of delta queues is a linked list, each node in the linked list is an array having a predetermined number of entries, and each array entry is configured to store an LFMU, and wherein the controller is further configured to:
   in response to determining that the target delta queue is full, append a new node to the target delta queue,
   add the L2P page to the target delta queue,
   increment the page invalidation frequency for the target delta queue, and
   perform the L2P operation for the particular LFMU.

5. The data storage device of claim 2, wherein the controller is further configured to determine whether a L2P page associated with the particular LFMU is stored in a particular one of the plurality of delta queues based on an address of the particular LFMU using a hashing function.

6. The data storage device of claim 2, wherein the controller is further configured to:
   calculate a delta queue invalidation frequency for each of the plurality of delta queues based on a sum of page invalidation frequencies of each L2P page in a respective delta queue,
   select a delta queue having a lowest delta queue invalidation frequency of the plurality of delta queues as the one of the plurality of delta queues to flush, and
   reset the delta queue invalidation frequency of the delta queue that is selected.

7. The data storage device of claim 1, wherein the plurality of delta queues are configured to collectively store a maximum number of the delta queue entries, and wherein the controller is further configured to determine that a queue flush is required when a total number of the delta queue entries collectively stored in the plurality of delta queues is equal to the maximum number of the delta queue entries.

8. A method performed by a data storage device that receives commands from a host device, the method comprising:
   controlling, with a controller, a second memory to store a plurality of delta queues, each of the plurality of delta queues includes delta queue entries, the delta queue entries are grouped into one or more logical-to-physical (L2P) pages, and each of the one or more L2P pages includes a plurality of logical flash management units (LFMUs) that corresponds to a plurality of physical addresses in a non-volatile memory;

determining, with the controller, that a delta queue flush is required;

in response to determining that a delta queue flush is required, selecting, with the controller, one of the plurality of delta queues to flush; and flushing, with the controller, the one or more L2P pages stored in the one of the plurality of delta queues to the non-volatile memory.

9. The method of claim 8, further comprising:

determining, with the controller, a page invalidation frequency for each L2P page stored in the plurality of delta queues, receiving, with the controller, a request to perform an L2P operation for a particular LFMU, determining, with the controller, whether a L2P page associated with the particular LFMU is stored in a particular one of the plurality of delta queues, in response to determining that the L2P page associated with the particular LFMU is stored in the particular one of the plurality of delta queues, incrementing, with the controller, the page invalidation frequency for the L2P page, and performing, with the controller, the L2P operation for the particular LFMU.

10. The method of claim 9, further comprising:

in response to determining that the L2P page associated with the particular LFMU is not stored in the particular one of the plurality of delta queues, selecting, with the controller, one of the plurality of delta queues as a target delta queue, determining, with the controller, whether the target delta queue is full, in response to determining that the target delta queue is not full, adding, with the controller, the L2P page to the target delta queue, incrementing, with the controller, the page invalidation frequency for the target delta queue, and performing, with the controller, the L2P operation for the particular LFMU.

11. The method of claim 10, wherein each of the plurality of delta queues is a linked list, each node in the linked list is an array having a predetermined number of entries, and each array entry is configured to store an LFMU, and the method further comprises:

in response to determining that the target delta queue is full, appending, with the controller, a new node to the target delta queue, adding, with the controller, the L2P page to the target delta queue, incrementing, with the controller, the page invalidation frequency for the target delta queue, and performing, with the controller, the L2P operation for the particular LFMU.

12. The method of claim 9, further comprising:

determining, with the controller, whether a L2P page associated with the particular LFMU is stored in a particular one of the plurality of delta queues based on an address of the particular LFMU using a hashing function.

13. The method of claim 9, further comprising:

calculating, with the controller, a delta queue invalidation frequency for each of the plurality of delta queues based on a sum of page invalidation frequencies of each L2P page in a respective delta queue, selecting, with the controller, a delta queue having a lowest delta queue invalidation frequency of the plurality of delta queues as the delta queue to flush, and resetting, with the controller, the delta queue invalidation frequency of the delta queue that is selected.

14. The method of claim 8, further comprising:

wherein the plurality of delta queues are configured to collectively store a maximum number of delta queue entries, and wherein determining that a queue flush is required includes determining, with the controller, that a total number of delta queue entries collectively stored in the plurality of delta queues is equal to the maximum number of delta queue entries.

15. A non-transitory computer-readable medium comprising instructions that, when executed by a data storage controller, causes the data storage controller to perform a set of operations comprising:

controlling a second memory to store a plurality of delta queues, each of the plurality of delta queues includes delta queue entries, the delta queue entries are grouped into one or more logical-to-physical (L2P) pages, and each of the one or more L2P pages is associated with a plurality of logical flash management units (LFMUs) that corresponds to a plurality of physical addresses in a non-volatile memory;

determining that a delta queue flush is required;

in response to determining that a delta queue flush is required, selecting one of the plurality of delta queues to flush; and flushing the one or more L2P pages stored in the one of the plurality of delta queues to the non-volatile memory.

16. The non-transitory computer-readable medium of claim 15, the set of operations further comprising:

calculating a page invalidation frequency for each L2P page stored in the plurality of delta queues, receiving a request to perform an L2P operation for a particular LFMU;

determining whether a L2P page associated with the particular LFMU is stored in a particular one the plurality of delta queues, in response to determining that the L2P page associated with the particular LFMU is stored in the particular one of the plurality of delta queues, incrementing the page invalidation frequency for the L2P page, and performing the L2P operation for the particular LFMU.

17. The non-transitory computer-readable medium of claim 16, the set of operations further comprising:

in response to determining that the L2P page associated with the particular LFMU is not stored in the particular one of the plurality of delta queues, selecting one of the plurality of delta queues as a target delta queue;

determining whether the target delta queue is full;

in response to determining that the target delta queue is not full, adding the L2P page to the target delta queue;

incrementing the page invalidation frequency for the target delta queue; and performing the L2P operation for the particular LFMU.

18. The non-transitory computer-readable medium of claim 17, wherein each of the plurality of delta queues is a linked list, each node in the linked list is an array having a predetermined number of entries, and each array entry is configured to store an LFMU, and the set of operations further comprises:

in response to determining that the target delta queue is full, appending new node to the target delta queue;

adding the L2P page to the target delta queue;

incrementing the page invalidation frequency for the target delta queue; and performing the L2P operation for the particular LFMU.

19. The non-transitory computer-readable medium of claim 16, the set of operations further comprising:
    determining whether a L2P page associated with the particular LFMU is stored in a particular one the plurality of delta queues based on an address of the particular LFMU using a hashing function.

20. The non-transitory computer-readable medium of claim 16, the set of operations further comprising:
    calculating a delta queue invalidation frequency for each of the plurality of delta queues based on a sum of page invalidation frequencies of each L2P page in a respective delta queue;
    selecting a delta queue having a lowest delta queue invalidation frequency of the plurality of delta queues as the delta queue to flush; and
    resetting the delta queue invalidation frequency of the delta queue that is selected.

\* \* \* \* \*